(12) United States Patent
Deel (10) Patent No.: US 10,712,227 B2
(45) Date of Patent: Jul. 14, 2020

(54) WASHPIPE LIFE PREDICTION (71) Applicant: NABORS DRILLING TECHNOLOGIES USA, INC., Houston, TX (US)

(72) Inventor: Steve Deel, Cypress, TX (US)

(73) Assignee: NABORS DRILLING TECHNOLOGIES USA, INC., Houston, TX (US)

(*) Notice: Subject to any disclaimer, the term of this patent is extended or adjusted under 35 U.S.C. 154(b) by 422 days.

(21) Appl. No.: 15/887,534

(22) Filed: Feb. 2, 2018

(65) Prior Publication Data
US 2018/0231432 A1  Aug. 16, 2018

Related U.S. Application Data (60) Provisional application No. 62/458,895, filed on Feb. 14, 2017.

(51) Int. Cl.
G01B 3/44 (2006.01)
G01M 3/28 (2006.01)
E21B 21/08 (2006.01)
E21B 47/06 (2012.01)
E21B 3/02 (2006.01)

(52) U.S. Cl.
CPC ........... *G01M 3/2815* (2013.01); *E21B 21/08* (2013.01); *E21B 47/06* (2013.01); *E21B 3/02* (2013.01)

(58) Field of Classification Search
CPC .................................................. G01M 3/2815

USPC ........................................... 702/34; 166/88.4
See application file for complete search history.

(56) References Cited

U.S. PATENT DOCUMENTS

| 6,007,105 | A | 12/1999 | Dietle et al. | |
|---|---|---|---|---|
| 6,722,450 | B2 | 4/2004 | Schultz et al. | |
| 6,885,972 | B2* | 4/2005 | Samata | G05B 19/4065 702/182 |
| 6,923,254 | B2* | 8/2005 | Morrow | E21B 17/05 166/88.4 |
| 7,213,660 | B2 | 5/2007 | Martin | |
| 9,182,316 | B2 | 10/2015 | Cocconcelli et al. | |
| 2006/0042789 | A1* | 3/2006 | Kubala | F16L 27/082 166/88.4 |

* cited by examiner

Primary Examiner — Aditya S Bhat
(74) Attorney, Agent, or Firm — Adolph Locklar (57) ABSTRACT A washpipe assembly for use in a drilling operation, comprises a washpipe having upper and lower ends, an upper seal assembly in fluid communication with the washpipe upper end and including at least one seal in sealing engagement with the washpipe, a lower seal assembly in fluid communication with the washpipe lower end and including at least one seal in sealing engagement with the washpipe, at least one of the upper and lower seal assemblies being rotatable relative to the washpipe at a relative rotation rate, a pressure sensor for measuring a fluid pressure indicative of fluid pressure in the washpipe, a rotation sensor for measuring the relative rotation rate; and a microprocessor adapted to calculate a total pressure-distance value (TPDV) indicative of the amount of washpipe assembly lifespan expended, wherein the TPDV is a function of the relative rotation rate and the pressure.

18 Claims, 6 Drawing Sheets

WASHPIPE LIFE PREDICTION

CROSS-REFERENCE TO RELATED APPLICATIONS

This application claims priority from U.S. provisional application No. 62/458,895 filed Feb. 14, 2017, which is incorporated herein by reference in its entirety.

TECHNICAL FIELD/FIELD OF THE DISCLOSURE

The present disclosure relates generally to drilling rig equipment and methods of use of a washpipe.

BACKGROUND OF THE DISCLOSURE

During a drilling operation, fluids are circulated through the drill string from the surface to cool and lubricate the drill bit and flush out cuttings and other matter from the wellbore. The upper end of the rotating drill string is mechanically coupled to the rotating stem of a swivel or top drive. A washpipe assembly allows for a fluid seal between the stationary and nonrotating component of the swivel or top drive known as a gooseneck and the rotating upper end of the drill stem. Typically, the washpipe assembly includes lower and upper seal assemblies. The upper and lower seal assemblies typically have packing ring seals that contact the outer surface of the washpipe. The upper and lower seal assemblies are designed to prevent contact between the washpipe and spacing rings that center the washpipe in the upper and lower seal assemblies while fluidly sealing against the washpipe. However, as the packing ring seals are worn away, the washpipe may contact the spacing rings causing damage to the washpipe or one or more of the seal assemblies, requiring repair of the washpipe assembly. Additionally, traditional washpipe assembly designs require components of the washpipe assembly to be coupled by threaded connections, which may require the use of tools such as sledge hammers to assemble. As washpipe assemblies are often suspended over a drill floor, difficulty in transportation and use of the tools may increase risk of injury to drill rig personnel. Washpipe assembly operational lifespan, as used herein, refers to the amount a washpipe assembly may be used before failure is expected or a repair or refurbishment is to be undertaken. Refurbishment, as used herein, may include replacement of a seal, the washpipe, or any other component of the washpipe assembly.

SUMMARY

The present disclosure provides a method comprising the steps of a) installing a washpipe assembly on a drilling rig, b) operating the washpipe assembly, c) measuring a rotation rate of the washpipe assembly, d) measuring a pressure within the washpipe assembly, e) calculating a total pressure-distance value indicative of the amount of washpipe assembly operational lifespan expended, wherein the total pressure-distance value is a function of the measured rotation rate and measured pressure, f) comparing the total pressure-distance value with a predetermined threshold pressure-distance value so as to generate an expected life value, and g) replacing or refurbishing the washpipe assembly based on the expected life value. Step e) may comprise e1) calculating an average pressure-velocity value for a predetermined time period, e2) multiplying the average pressure-velocity value for the length of the predetermined time period to determine a pressure-distance value for the time period, and e3) summing the pressure-distance values for each time period during which the washpipe assembly is in operation so as to determine the total pressure-distance value.

In some embodiments, the pressure-velocity value may be calculated according to:

$$PV = V_w \times P_f$$

where PV is the pressure-velocity value, $V_w$ is the linear velocity of the washpipe assembly and $P_f$ is the pressure within the washpipe assembly. The linear velocity $V_w$ may be calculated according to:

$$V_w = \pi D_w \times R$$

where $D_w$ is the circumference of the washpipe and R is a rotation rate of the washpipe. The predetermined threshold pressure-distance value may be determined by experimental testing of a test washpipe assembly and may be based on the pressure-distance value of the test washpipe assembly when a preselected amount of degradation occurs. The predetermined threshold pressure-distance value may be obtained from a lookup table on the basis of the composition of a drilling fluid used with the washpipe assembly or the composition of a seal in the washpipe assembly The washpipe assembly may comprise a washpipe and a seal and the seal may be in contact with the washpipe and form a fluid seal against the washpipe as the washpipe rotates. Refurbishing the washpipe comprises replacing the seal, the washpipe, or both.

The rotation rate may be measured with a rotation sensor, which may comprise a hall sensor, optical sensor, or mechanical sensor. The rotation sensor may be positioned on a washpipe or lower seal assembly of the washpipe assembly, a drill stem, or a drill string. The pressure within the washpipe assembly may be measured with a pressure transducer, which may be positioned on a mud pump, a gooseneck, a component of the washpipe assembly, a drill stem, or at a location along a drill string.

The step of calculating may be carried out by a measurement package, the measurement package comprising a processing module and a tangible, non-transitory computer readable memory media module. The measurement package may further comprise a comparison module and the comparing operation may be carried out using the comparison module.

The present disclosure also provides a washpipe assembly for use in a drilling operation, comprising a washpipe having upper and lower ends, an upper seal assembly in fluid communication with the washpipe upper end and including at least one seal in sealing engagement with the washpipe, a lower seal assembly in fluid communication with the washpipe lower end and including at least one seal in sealing engagement with the washpipe, at least one of the upper and lower seal assemblies being rotatable relative to the washpipe at a relative rotation rate, a pressure sensor for measuring a fluid pressure indicative of fluid pressure in the washpipe, a rotation sensor for measuring the relative rotation rate, and a microprocessor adapted to calculate a total pressure-distance value indicative of the amount of washpipe assembly operational lifespan expended, wherein the total pressure-distance value is a function of the measured relative rotation rate and the measured pressure.

The microprocessor may be configured to calculate an average pressure-velocity value for a predetermined time period, multiply the average pressure-velocity value for the length of the predetermined time period to determine a pressure-distance value for the time period, and sum the pressure-distance values for each time period during which the washpipe assembly is in operation so as to determine a total pressure-distance value. The average pressure-velocity value may be calculated according to:

$$PV_{avg} = V_{w,avg} \times P_{f,avg}$$

wherein PV is the average pressure-velocity value, $V_{w,avg}$ is the average linear velocity of the washpipe assembly during the time period, and $P_{f,avg}$ is the average pressure within the washpipe assembly during the time period. The linear velocity $V_{w,avg}$ may be calculated according to:

$$V_{w,avg} = \pi D_w \times R_{avg}$$

wherein $D_w$ is the circumference of the washpipe and R is the average relative rotation rate during the time period.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
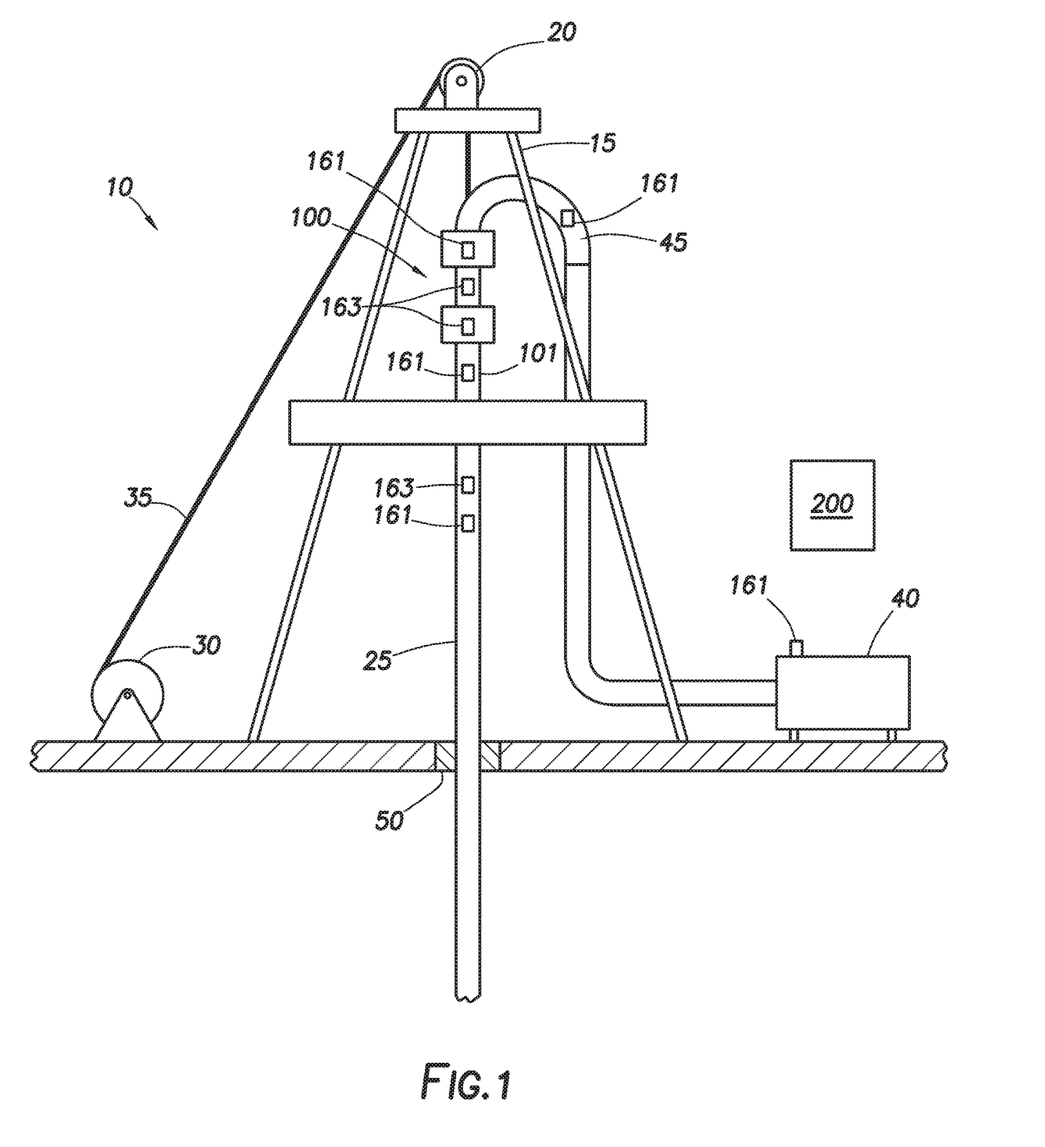
FIG. 1 depicts an overview of a drilling rig utilizing a washpipe assembly consistent with at least one embodiment of the present disclosure.

FIG. 1 depicts an overview of a drilling rig 10. Drilling rig 10 may include a derrick 15. Derrick 15 may serve to support crown block 20, which is used to hoist the drill string 25. Drill string 25 may be hoisted by, for example and without limitation, drawworks 30 by line 35. Drilling rig 10 may further include mud processing equipment 40, which may include, for example and without limitation, a mud pump. Mud processing equipment 40 may pump drilling fluid through a gooseneck 45 that is fluidly coupled to drill string 25 by washpipe assembly 100. Drill string 25 may be rotated by a top drive or may be rotated by rotary table 50. The upper end of drill string 25 may include a kelly pipe, may be the upper end of the topmost pipe stand of drill string 25, or may be a transfer pipe extending from a top drive. The uppermost rotating portion mechanically coupled to drill string 25 is referred to herein as drill stem 101.

Figure 1A:
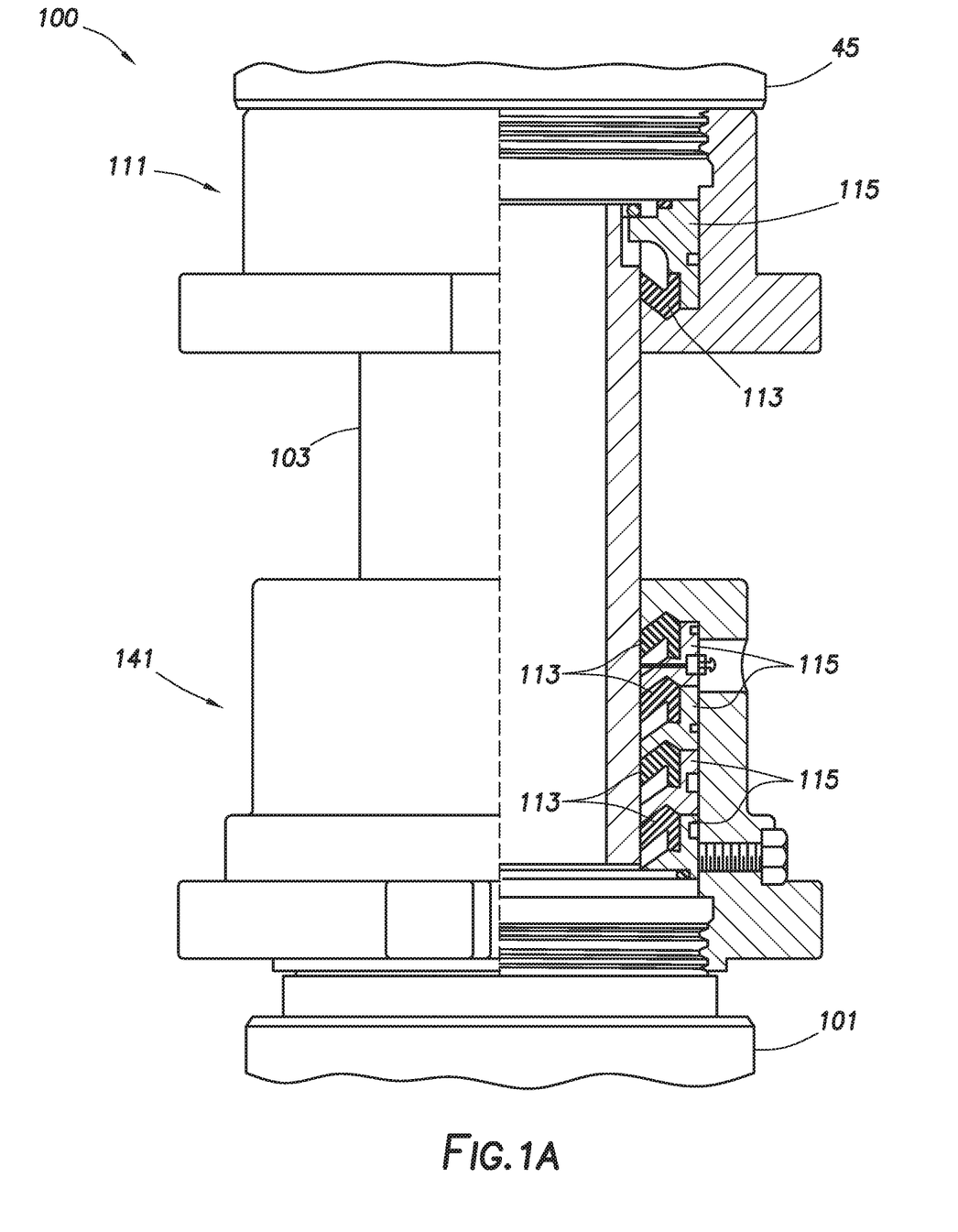
FIG. 1A depicts a partial cross section view of a washpipe assembly consistent with at least one embodiment of the present disclosure.

Washpipe assembly 100, as depicted in FIG. 1A, may include a washpipe 103, an upper seal assembly 111, and lower seal assembly 141. In some embodiments, washpipe 103 may fluidly couple upper seal assembly 111 and lower seal assembly 141. In some embodiments, washpipe 103 and upper seal assembly 111 may remain nonrotating as lower seal assembly 141 rotates with drill stem 101. In other embodiments, washpipe 103 may rotate with lower seal assembly 141 relative to upper seal assembly 111.

In some embodiments, upper seal assembly 111 may mechanically and fluidly couple to gooseneck 45. Upper seal assembly 111 may be mechanically coupled to gooseneck 45 by, for example and without limitation, a threaded connection, compression or flanged coupler, clip, or mechanical or chemical welding. Although described with respect to gooseneck 45, upper seal assembly 111 may be used with any tubular member.

In some embodiments, lower seal assembly 141 may mechanically couple to drill stem 101 by, for example and without limitation, a threaded connection, compression or flanged coupler, clip, or mechanical or chemical welding. Although described with respect to drill stem 101, lower seal assembly 141 may be used with any tubular member. Drill stem 101 may be mechanically and fluidly coupled to drill string 25. Drill stem 101 may mechanically couple to drill string 25 by, for example and without limitation, a threaded connection. In some embodiments, drill stem 101 may couple to drill string 25 through a top drive or one or more components of a top drive or through a kelly pipe for use with rotary table 50.

In some embodiments, upper seal assembly 111 and lower seal assembly 141 may include one or more seals 113 positioned between the respective seal assembly 111, 141 and washpipe 103. In some embodiments, upper seal assembly 111 and lower seal assembly 141 may include one or more spacing rings 115 positioned between the respective seal assembly 111, 141 and washpipe 103. As drilling operations continue and drill string 25 is rotated, one or more of washpipe 103 and seals 113 within upper seal assembly 111 and lower seal assembly 141 may be degraded by, for example and without limitation, mechanical contact between a rotating component and a nonrotating component. In some cases, the rate of degradation of these components may be affected by the total pressure-distance value, which is defined herein as a function of the effective relative distance traveled between seals 113 and washpipe 103 and the pressure of drilling fluid within drill string 25. In some cases, seals 113 may exert a higher force on washpipe 103 when the drilling fluid is at a higher pressure, resulting in a larger amount of degradation for a given distance traveled by seal 113. Likewise, at a lower pressure, a lower amount of degradation may occur for a given distance traveled by seal 113.

Referring again to FIG. 1, in some embodiments, the pressure of drilling fluid within drill string 25 may be measured by one or more pressure transducers 161. A pressure transducer 161 may, as depicted in FIG. 1, be positioned at one or more locations on drilling rig 10, including but not limited to, mud pumps 40, gooseneck 45, a component of washpipe assembly 100, drill stem 101, or at a location along drill string 25. Similarly, in some embodiments, the rotation rate of drill string 25, and therefore the relative rotation rate between washpipe 103 and seal 113, may be determined from the rotation rate of or measured by the top drive or rotary table. In other embodiments, the rotation rate of drill string 25 may be determined by a rotation sensor 163. Rotation sensor 163 may be adapted to determine the number of revolutions of drill string 25, which may be used to determine the rotation rate of drill string 25. Rotation sensor 163 may include, without limitation, one or more of a hall sensor, optical sensor, mechanical sensor, or other useful sensor. In some embodiments, as depicted in FIG. 1, a rotation sensor 163 may be positioned at one or more locations on drilling rig 10, including but not limited to on washpipe 103, lower seal assembly 141, drill stem 101, or drill string 25.

The rotation rate of drill string, denoted R, may be used to determine a linear velocity, denoted $V_w$, between washpipe 103 and seal 113. In some embodiments, the velocity, denoted may be determined according to:

$$V_w = C_w \times R$$

where $C_w$ is the circumference of washpipe 103. Substituting the diameter, $D_w$, of washpipe 103, the velocity $V_w$ may be expressed as:

$$V_w = \pi D_w \times R.$$

It will be understood that $D_w$ may be determined as the outside diameter of the washpipe, the inside diameter of the seals, the diameter of the sealing interface, or other diametrical measurement on which a relative distance calculation may be based.

Multiplying the velocity $V_w$ by the fluid pressure in drill string $V_w$ denoted $P_f$ for a given measurement of pressure and velocity may determine a pressure-velocity metric, referred to herein as a "PV" value, for the time of the sample according to:

$$PV = V_w \times P_f$$

In such an embodiment, PV may be proportional to both velocity $V_w$ and pressure $P_f$ in a linear equation as described above. In some embodiments, the equation for PV may include one or more higher-order terms or may be an equation other than a linear equation. In other embodiments, the equation may be selected from one of a preselected set of equations based on the current operating conditions. For example, in some embodiments, the PV calculation may include a multiplier when a preselected condition is encountered. For example, PV may include an additional multiplier when washpipe assembly 100 is operating at a velocity $V_w$ above a preselected velocity threshold or when washpipe assembly 100 is operating with a pressure $P_f$ above a preselected pressure threshold. In some embodiments, multiple equations may be selected between depending on the operating conditions. In some embodiments, the PV equation may be selected based on one or more drilling parameters, such as the type or composition of drilling fluid used with washpipe assembly 100 and the type or composition of seals 113.

In some embodiments, the PV value may be used to determine or calculate a washpipe assembly operational lifespan metric referring to the amount of washpipe assembly operational lifespan expended in terms of relative distance traveled at seal 113 multiplied by the pressure within the washpipe, defined as pressure-distance metric PD. For example, the average PV for a preselected time period may be monitored and used to determine PD value for that time period (i). In such an embodiment, calculation of PD value for time period i is found by multiplying the average PV value measured for the preselected time period by the amount of time t1 in the preselected time period:

$$PD_i = PV_i * t_i.$$

In some embodiments, the PD value may be expressed in terms of "PSI-miles" referring to the units of measure of the metric. For example and without limitation, when expressed in units of PSI-miles, pressure $P_f$ may be expressed in terms of pounds per square inch (PSI) and velocity $V_w$ may be measured in feet per minute. The calculated $PD_i$ may be converted from PSI-feet to PSI-miles by dividing by the number of feet in a mile, i.e. 5280 feet/mile. Similarly, the PD value may be expressed in terms of "kPa-meters." For example and without limitation, when expressed in units of kPa-meters, pressure $P_f$ may be expressed in terms of kilopascals (kPa) and velocity $V_w$ may be measured in meters per second.

In other embodiments, an integral may be taken for the time period rather than utilizing an average measurement. In some embodiments, the duration of the time period may be the interval between samples taken on pressure transducer 161 and rotation sensor 163, or may be a preselected, larger time period such as, for example and without limitation, one minute.

In some embodiments, the determined PD value for a given washpipe assembly 100 may be accumulated during operation of washpipe assembly 100. In some embodiments, the PD value calculated for each time interval may be summed to determine a total PD for the washpipe assembly 100 that may reflect the amount of operational lifespan remaining for the washpipe assembly 100. In some embodiments, the total PD a washpipe assembly 100 is expected to last may be determined experimentally by, for example and without limitation, testing of a test washpipe assembly until a preselected amount of degradation occurs. In other embodiments, the PD value may be determined based on a desired refurbishment schedule for the washpipe assembly 100 or may be based on a model of the washpipe assembly 100.

Figure 2:
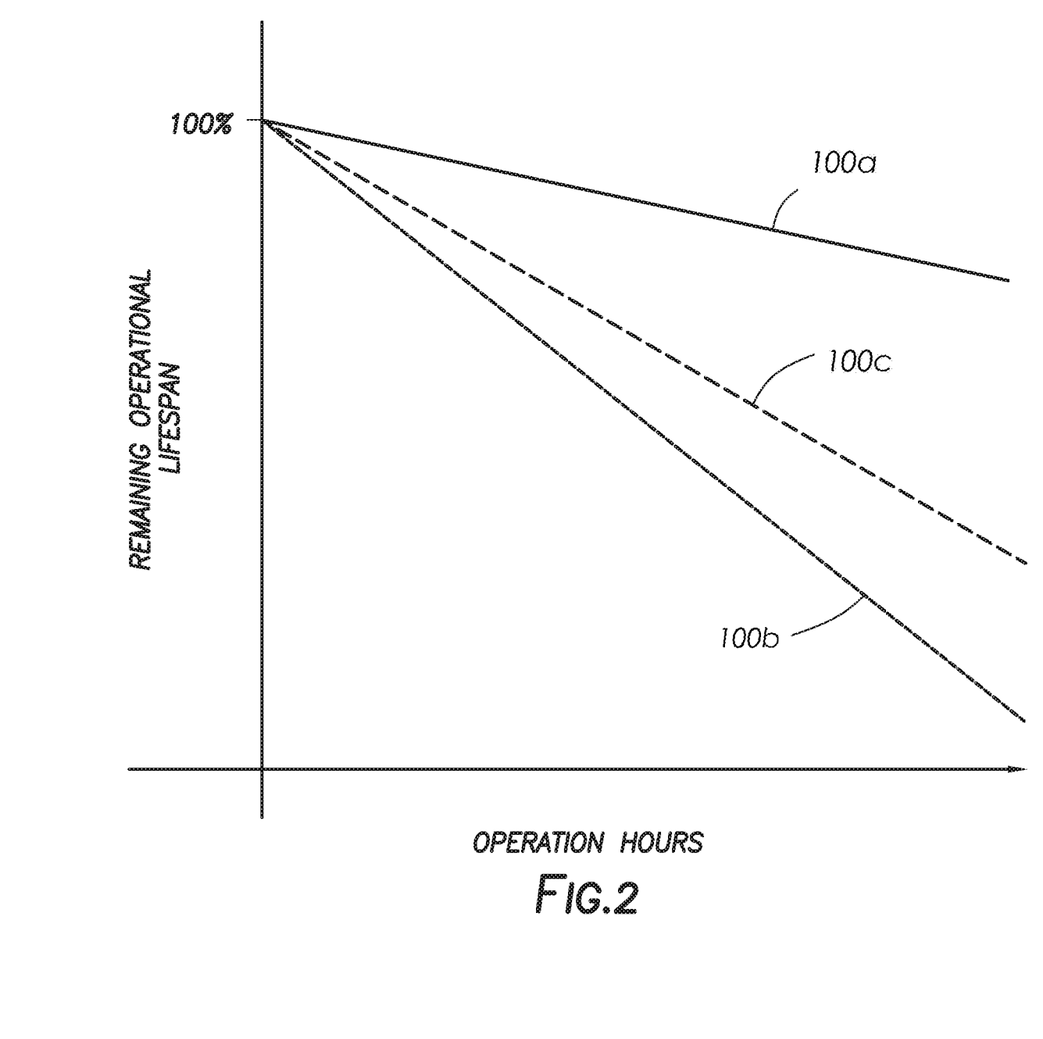
FIG. 2 is a chart depicting washpipe operational lifespan remaining for washpipe assemblies as calculated according to at least one embodiment of the present disclosure.

For example and without limitation, the total PD may be used to predict the expected washpipe operational lifespan expended for a given washpipe assembly 100. Because drilling operations vary, the number of hours for which a given washpipe assembly 100 has been used may not alone accurately predict the condition of and remaining life cycle of washpipe assembly 100 and the packing rings or seals. FIG. 2 depicts exemplary washpipe operational lifespan remaining for a lightly used washpipe assembly 100a and a washpipe operational lifespan remaining for a heavily used washpipe assembly 100b, each of which is further defined herein below, over time and compared with the washpipe operational lifespan remaining according to an hours-based metric (100c). In some embodiments, the use of total PD or PV instead of operating hours may allow an operator to determine that a lightly used washpipe assembly 100a having a low total PD or PV despite a large number of operating hours, i.e. a seal that was used at a low rotation rate, a low pressure, or both, may have more washpipe operational lifespan remaining than a metric based solely on operating hours would indicate. Based on this information, premature refurbishment of lightly used washpipe assembly 100a may be avoided. Similarly, an operator may recognize that because a heavily used washpipe assembly 100b has been used at a higher rotation rate, higher pressure, or both, and therefore has a high total PD or PV, it may require earlier refurbishment than the accumulated operating hours alone might indicate. Such refurbishment may, for example and without limitation, prevent undue damage to the heavily used washpipe assembly 100b or other components of the drilling rig caused by failure of heavily used washpipe assembly 100b.

Figure 4:
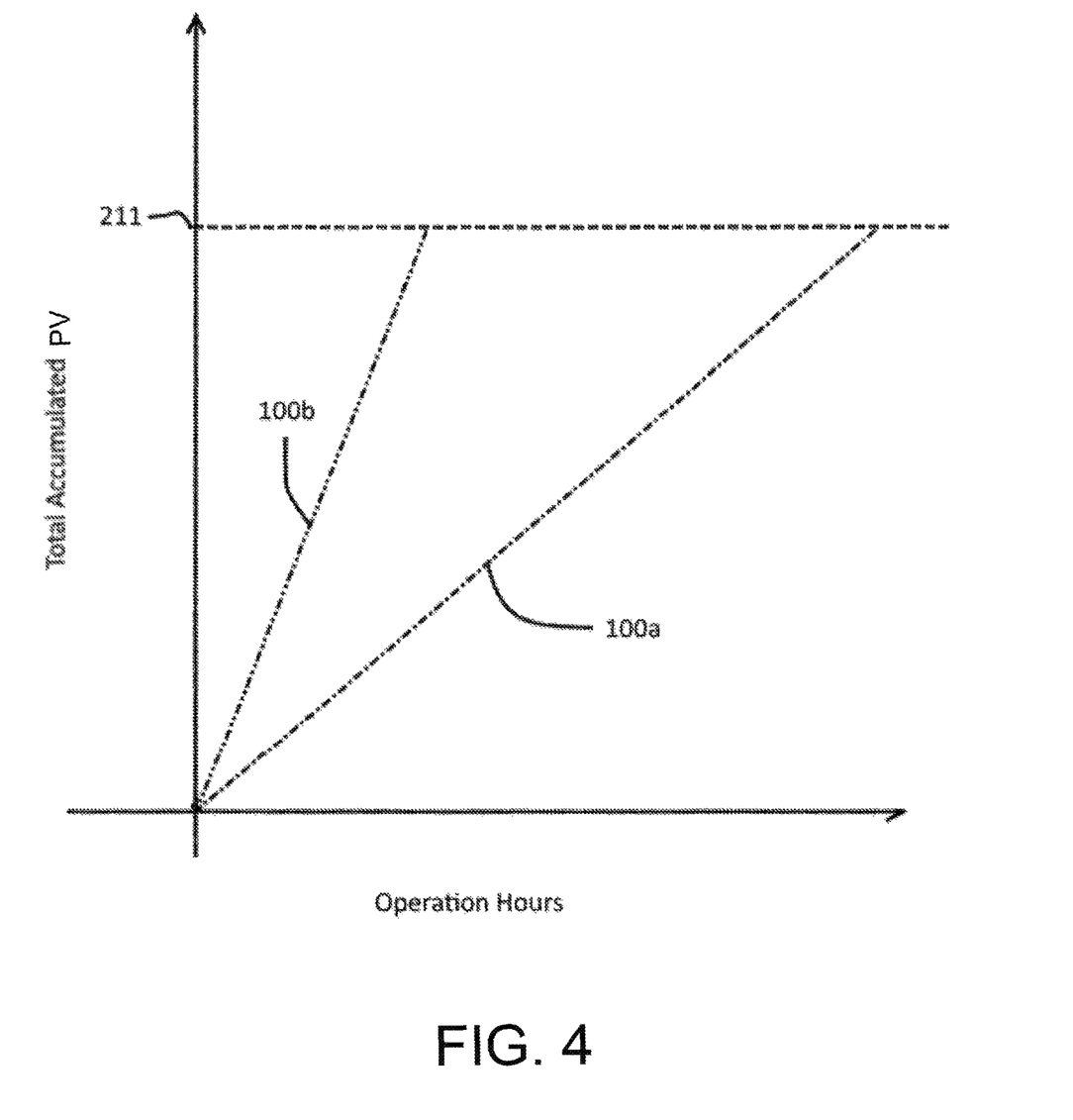
FIG. 4 is a chart depicting total accumulated PD for washpipe assemblies as calculated according to at least one embodiment of the present disclosure.
Figure 5:
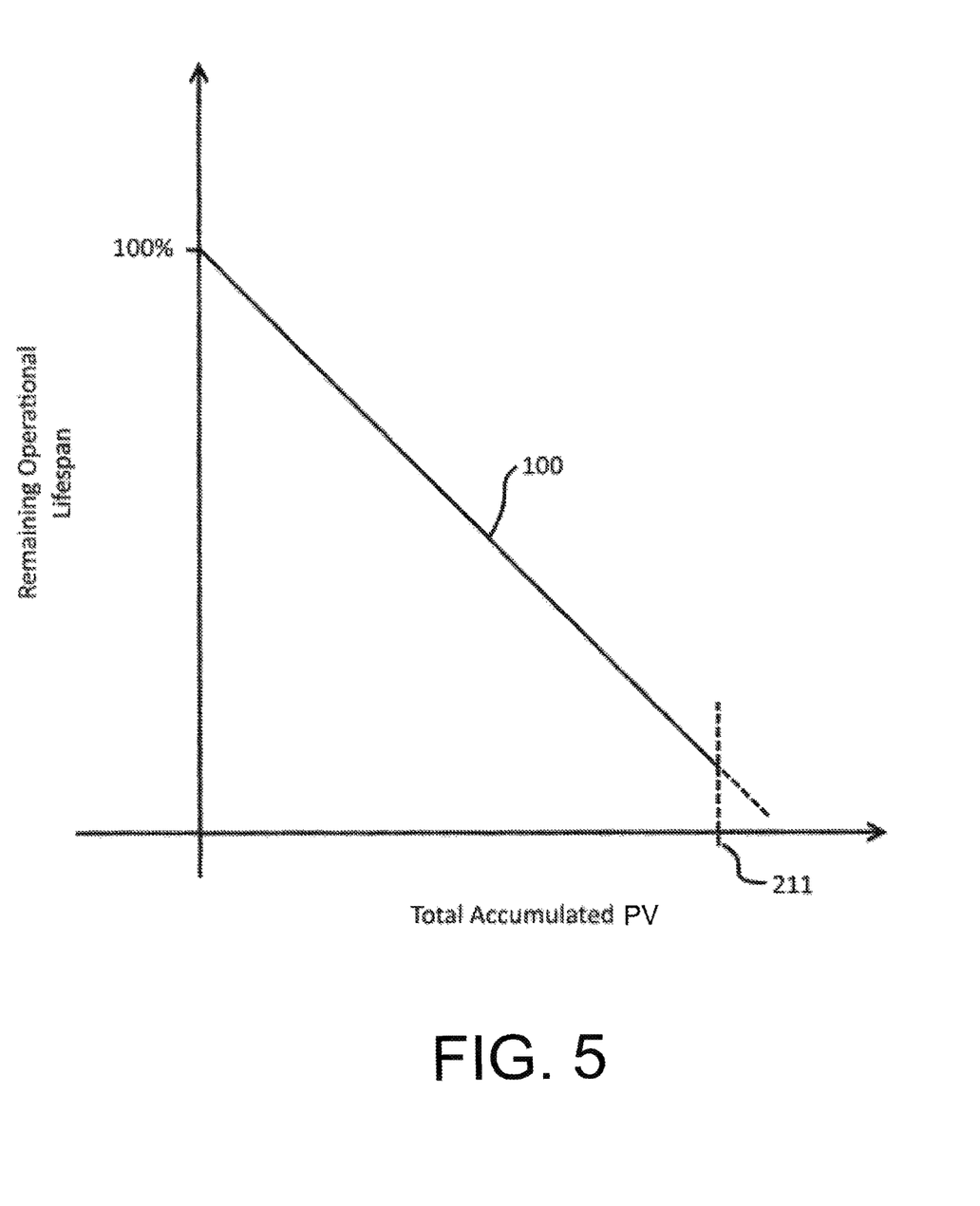
FIG. 5 is a chart depicting total accumulated PD for a washpipe assembly vs. the remaining operational lifespan of the washpipe assembly as calculated according to at least one embodiment of the present disclosure.

By way of further illustration and referring briefly to FIGS. 4 and 5, the total accumulated PV for heavily used washpipe assembly 100b increases at a higher rate than the total accumulated PV for lightly used washpipe assembly 100a, and therefore reaches a preselected threshold value 211 in fewer operation hours. As shown in FIG. 5, the total accumulated PV for washpipe assembly 100 may, in some embodiments, correspond linearly with the remaining operational lifespan such that remaining operational lifespan can be predicted or calculated based on total accumulated PV. Once preselected threshold value 211 is reached regardless of operation hours, refurbishment may be undertaken or recommended. Such refurbishment may, for example and without limitation, prevent undue damage to heavily used washpipe assembly 100b or other components of a drilling rig caused by failure of heavily used washpipe assembly 100b.

Figure 3:
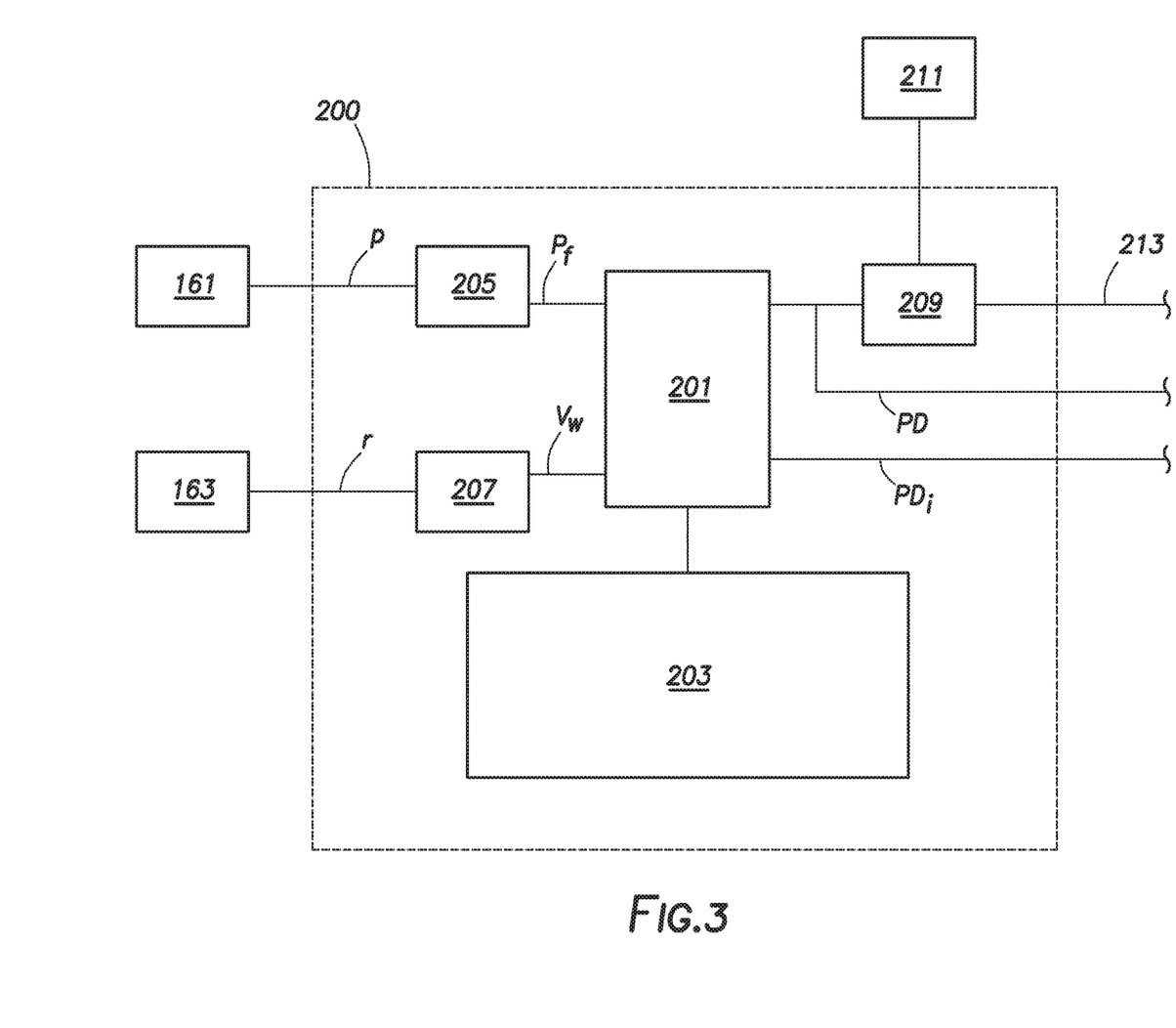
FIG. 3 depicts a schematic view of a measurement package consistent with at least one embodiment of the present disclosure.

Referring now to FIG. 3, in some embodiments, total PD calculation may be undertaken by a measurement package 200. Measurement package 200 may include a processing module 201, which in turn may include one or more of a microprocessor, microcontroller, processor, FPGA, or other logic modules. Measurement package 200 may include a tangible, non-transitory, computer readable memory media module 203 that may, in some embodiments, store one or more readings or calculations as described further herein below as well as computer program instructions for carrying out one or more operations as described herein.

In some embodiments, measurement package 200 may include a pressure signal receiver 205 and a rotation signal receiver 207. Pressure signal receiver 205 and rotation signal receiver 207 may be operatively coupled by wire or wirelessly to pressure transducer(s) 161 and rotation sensor(s) 163, respectively. Pressure signal receiver 205 may receive a signal p from pressure transducer 161 indicative of the pressure in drill string 25, and may output pressure $P_f$. Rotation signal receiver 207 may receive a signal r from rotation sensor 163 indicative of the rotation rate of drill string 25, and may output velocity $V_w$. In some embodiments, rotation sensor 163 may output a pulsed signal representing a rotation or partial rotation of drill string 25. Rotation signal receiver 207 may, in some embodiments, determine velocity $V_w$ from the pulsed signal as discussed herein above. $P_f$ and $V_w$ as output by pressure signal receiver 205 and rotation signal receiver 207 may be used by processing module 201 to calculate a PD value for a time period ($PD_i$) or a total PD value (TPDV), either of which may be output from measurement package 200.

In some embodiments, measurement package 200 may also include a comparison module 209. Comparison module 209 may compare total PD value with a preselected threshold value 211, and may output a warning or alert signal 213. The preselected threshold value may come from a lookup table and may be based on, among other things, composition of the drilling fluid and/or seals. Warning or alert signal 213 may indicate that the calculated total PD value is above preselected threshold value 211, indicating, for example and without limitation, that washpipe assembly 100 may be due for refurbishment.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the scope of the present disclosure.

What is claimed is:

1. A method comprising:
   a) installing a washpipe assembly on a drilling rig;
   b) operating the washpipe assembly;
   c) measuring a rotation rate of the washpipe assembly;
   d) measuring a pressure within the washpipe assembly;
   e) calculating a total pressure-distance value indicative of the amount of washpipe assembly operational lifespan expended, wherein the total pressure-distance value is a function of the measured rotation rate and measured pressure;
   f) comparing the total pressure-distance value with a predetermined threshold pressure-distance value so as to generate an expected life value; and
   g) replacing or refurbishing the washpipe assembly based on the expected life value.

2. The method of claim 1, wherein step e) comprises:
   e1) calculating an average pressure-velocity value for a predetermined time period;
   e2) multiplying the average pressure-velocity value for the length of the predetermined time period to determine a pressure-distance value for the time period; and
   e3) summing the pressure-distance values for each time period during which the washpipe assembly is in operation so as to determine the total pressure-distance value.

3. The method of claim 2 wherein the pressure-velocity value is calculated according to:

$$PV = V_w \times P_f$$

where PV is the pressure-velocity value, $V_w$ is the linear velocity of the washpipe assembly, and $P_f$ is the pressure within the washpipe assembly.

4. The method of claim 3 wherein the washpipe has a diameter, and wherein the linear velocity $V_w$ is calculated according to:

$$V_w = \pi D_w \times R$$

where $D_w$ is the circumference of the washpipe and R is a rotation rate of the washpipe.

5. The method of claim 3 wherein the washpipe assembly comprises a washpipe and a seal, wherein the seal is in contact with the washpipe and forms a fluid seal against the washpipe as the washpipe rotates, and wherein refurbishing the washpipe comprises replacing the seal, the washpipe, or both.

6. The method of claim 1 wherein the predetermined threshold pressure-distance value is determined by experimental testing of a test washpipe assembly.

7. The method of claim 6 wherein the predetermined threshold pressure-distance value is determined based on the pressure-distance value of the test washpipe assembly when a preselected amount of degradation occurs.

8. The method of claim 1 wherein the predetermined threshold pressure-distance value is obtained from a lookup table on the basis of the composition of a drilling fluid used with the washpipe assembly or the composition of s seal in the washpipe assembly.

9. The method of claim 1 wherein the rotation rate is measured with a rotation sensor, the rotation sensor comprising a hall sensor, optical sensor, or mechanical sensor.

10. The method of claim 9 wherein the rotation sensor is positioned on a washpipe or lower seal assembly of the washpipe assembly, a drill stem, or a drill string.

11. The method of claim 1, wherein the pressure within the washpipe assembly is measured with a pressure transducer.

12. The method of claim 11, wherein the pressure transducer is positioned on a mud pump, a gooseneck, a component of the washpipe assembly, a drill stem, or at a location along a drill string.

13. The method of claim 1, wherein the calculating operation is carried out by a measurement package, the measurement package comprising a processing module and a tangible, non-transitory computer readable memory media module.

14. The method of claim 13, wherein the measurement package further comprises a comparison module, wherein the comparing operation is carried out using the comparison module.

15. A washpipe assembly for use in a drilling operation, comprising:
   a washpipe having upper and lower ends;
   an upper seal assembly in fluid communication with the washpipe upper end and including at least one seal in sealing engagement with the washpipe;
   a lower seal assembly in fluid communication with the washpipe lower end and including at least one seal in sealing engagement with the washpipe;
   at least one of the upper and lower seal assemblies being rotatable relative to the washpipe at a relative rotation rate;
   a pressure sensor for measuring a fluid pressure indicative of fluid pressure in the washpipe;
   a rotation sensor for measuring the relative rotation rate; and
   a microprocessor adapted to calculate a total pressure-distance value indicative of the amount of washpipe assembly operational lifespan expended, wherein the total pressure-distance value is a function of the measured relative rotation rate and the measured pressure.

16. The assembly of 15, wherein the microprocessor is configured to:
   calculate an average pressure-velocity value for a predetermined time period;
   multiply the average pressure-velocity value for the length of the predetermined time period to determine a pressure-distance value for the time period; and
   sum the pressure-distance values for each time period during which the washpipe assembly is in operation so as to determine a total pressure-distance value.

17. The assembly of claim 16 wherein the average pressure-velocity value is calculated according to:

$$PV_{avg} = V_{w,avg} \times P_{f,avg}$$

wherein PV is the average pressure-velocity value, $V_{w,avg}$ is the average linear velocity of the washpipe assembly during the time period, and $P_{f,avg}$ is the average pressure within the washpipe assembly during the time period.

18. The assembly of claim 17 wherein the washpipe has a diameter, and wherein the linear velocity $V_{w,avg}$ is calculated according to:

$$V_{w,avg} = \pi D_w \times R_{avg}$$

wherein $D_w$ is the circumference of the washpipe and R is the average relative rotation rate during the time period.

* * * * *